(12) United States Patent
Ikebukuro (10) Patent No.: US 11,528,898 B2
(45) Date of Patent: Dec. 20, 2022

(54) HANDLE OPERATION ASSIST DEVICE AND HANDLE OPERATION ASSIST PROGRAM

(71) Applicant: Shimano Inc., Osaka (JP)

(72) Inventor: Satoshi Ikebukuro, Osaka (JP)

(73) Assignee: Shimano Inc., Osaka (JP)

( * ) Notice: Subject to any disclaimer, the term of this patent is extended or adjusted under 35 U.S.C. 154(b) by 643 days.

(21) Appl. No.: 16/573,778

(22) Filed: Sep. 17, 2019

(65) Prior Publication Data

US 2020/0107529 A1    Apr. 9, 2020

(30) Foreign Application Priority Data

Oct. 5, 2018    (JP) .............................. JP2018-190252

(51) Int. Cl.
*A01K 89/01*    (2006.01)
*A01K 97/12*    (2006.01)
*A01K 89/015*    (2006.01)
*A01K 89/00*    (2006.01)

(52) U.S. Cl.
CPC .......... *A01K 97/125* (2013.01); *A01K 89/006* (2013.01); *A01K 89/0114* (2013.01); *A01K 89/0193* (2015.05)

(58) Field of Classification Search
CPC .............. A01K 97/125; A01K 89/0193; A01K 89/006; A01K 89/0114; A01K 89/004; A01K 89/012; A01K 89/017; A01K 89/0183

See application file for complete search history.

(56) References Cited

FOREIGN PATENT DOCUMENTS

| | | | |
|---|---|---|---|
| CN | 104740860 A | * | 7/2015 |
| JP | H1147431 A | * | 2/1993 |
| JP | 11-187790 A | | 7/1999 |
| JP | 2002112676 A | * | 4/2002 |
| JP | 2001503610 A | * | 3/2011 |
| JP | 2016-129501 A | | 7/2016 |
| JP | 2017116549 A | * | 6/2017 ............... B62D 1/04 |
| JP | 6200787 B2 | | 9/2017 |
| KR | 101027408 B1 | * | 4/2011 |

OTHER PUBLICATIONS

GB Search Report of corresponding GP Application No. 1914005.2 dated Apr. 6, 2020.

* cited by examiner

*Primary Examiner* — Emmanuel M Marcelo (74) *Attorney, Agent, or Firm* — Global IP Counselors, LLP (57) ABSTRACT

A handle operation assist device includes a handle angular velocity measuring unit, an error calculator and a notification unit. The handle angular velocity measuring unit is configured to measure a handle angular velocity based on an output of a sensor configured to detect an angular velocity corresponding to rotation of a fishing reel handle. The error calculator is configured to calculate an error in the handle angular velocity with respect to a reference angular velocity. The notification unit is configured to carry out notification regarding the error.

8 Claims, 5 Drawing Sheets

HANDLE OPERATION ASSIST DEVICE AND HANDLE OPERATION ASSIST PROGRAM

CROSS-REFERENCE TO RELATED APPLICATIONS

This application claims priority to Japanese Patent Application No. 2018-190252, filed on Oct. 5, 2018. The entire disclosure of Japanese Patent Application No. 2018-190252 is hereby incorporated herein by reference.

BACKGROUND

Field of the Invention

The present invention relates to a handle operation assist device and a handle operation assist program.

Background Art

In convention fishing rhythm transmitter technology, a winding rhythm of a reel corresponding to each rotation is calculated based on a recommended retrieval speed corresponding to a moved object, such as a lure, and the winding length per one rotation of the reel handle, and the calculated winding rhythm is reported (for example, refer to Japanese Patent No. 6200787).

Depending on the type of fishing, there are situations in which it can be required to perform an operation to rotate the reel handle at constant speed, in order to hold the winding speed (retrieval speed) of the tackle constant. A handle operation for keeping the retrieval speed constant in this manner is also called constant-speed winding.

In order to carry out constant-speed winding as stably as possible at a target speed, it is necessary to prevent changes in the speed even within one rotation of the handle during the operation of rotating the reel handle.

However, in the rhythm notification by the technology disclosed in Japanese Patent No. 6200787, only the timing for each rotation is shown, so that it is not possible to execute a guidance that allows the operation by the user to keep the retrieval speed constant within one rotation.

SUMMARY

In consideration of the circumstances described above, an object of the present invention is to provide guidance to the user concerning the speed with which the handle should be rotated within one rotation of the handle of a fishing reel.

One aspect of the present invention for solving the problem described above is a handle operation assist device comprising a handle angular velocity measuring unit that measures the handle angular velocity based on an output of a sensor provided to detect the angular velocity corresponding to the rotation of the fishing reel handle, an error calculator that calculates errors in the handle angular velocity with respect to a reference angular velocity, and a notification unit that reports the errors.

According to the above-described configuration, the errors in the handle angular velocity with respect to the reference angular velocity measured in accordance with the rotation of the handle can be reported to the user as a rotational irregularity of the handle. Here, the handle angular velocity is obtained as an indication of velocity change within one rotation when the handle is rotated. As a result, in the present invention, it is possible to notify the user of a rotational irregularity even within one rotation of the handle, when assisting the user to carry out "constant-speed winding" for rotating the handle at a constant speed. That is, when the user performs constant-speed winding, the user can carry out a handle operation so as to correct the rotational irregularity within one rotation.

Another aspect of the present invention is the handle operation assist device described above, further comprising a reference angular velocity calculator that calculates the above-described reference angular velocity based on the handle angular velocity measured during a set period of time in the past.

According to the above-described configuration, it is possible set the reference angular velocity in accordance with the speed with which the user rotates the handle during actual fishing. It is thereby possible to simply set the appropriate reference angular velocity corresponding to actual fishing.

Another aspect of the present invention is that in the handle operation assist device described above, the notification unit can report the error by outputting a notification sound.

According to the above-described configuration, the error in the handle angular velocity with respect to the reference angular velocity can be reported to the user by sound. Here, the user need not rely on a visual means to check the error, but can check the error while listening to the notification sound. It is thereby possible for the user to adjust the speed of the handle operation for constant-speed winding while concentrating on fishing.

Another aspect of the present invention is that in the handle operation assist device described above, the notification unit can change the notification sound in a prescribed manner in accordance with changes in the error.

According to the above-described configuration, the notification sound changes in some manner in accordance with changes in the error. It is thereby possible for the user to visually ascertain the error from changes in the notification sound. In this embodiment, when carrying out constant-speed winding, the user simply needs to carry out a handle operation such that, for example, the degree of change in the notification sound is reduced.

Another aspect of the present invention is that in the handle operation assist device described above, the notification unit can change the pitch of the notification sound in accordance with changes in the error.

According to the above-described configuration, the pitch of the notification sound changes in accordance with changes in error. It is thereby possible for the user to sensuously ascertain errors from a change in the pitch of the notification sound. In this embodiment, when carrying out the constant-speed winding, the user simply needs to carry out a handle operation such that the pitch of the notification sound is constant in relation to the reference angular velocity.

Another aspect of the present invention is that in the handle operation assist device described above, when the error is greater than or equal to a certain value, the notification unit changes the pitch of the notification sound at a change rate that is greater than when the error is less than the certain value.

According to the above-described configuration, the change in the pitch of the notification sound is large when the error is greater than or equal to the certain value. It is thereby possible for the user to clearly know when the error is greater than or equal to the certain value and to immediately carry out a handle operation to reduce the error.

Another aspect of the present invention is that in the handle operation assist device described above, the notification unit can report the error using a display.

According to the above-described configuration, it is possible to report the error visually in an easily comprehensible manner.

Another aspect of the present invention is to provide a handle operation assist program for causing a computer as a handle operation assist device to function as a handle angular velocity measuring unit that measures the handle angular velocity based on an output of a sensor so as to detect the angular velocity corresponding to the rotation of the fishing reel handle, an error calculator that calculates the error of the handle angular velocity with respect to a reference angular velocity, and a notification unit that reports the error.

As described above, according to the present invention, it is possible to provide guidance to the user concerning the speed with which the handle should be rotated within one rotation of the handle of a fishing reel.

DETAILED DESCRIPTION OF EMBODIMENTS

Figure 1:
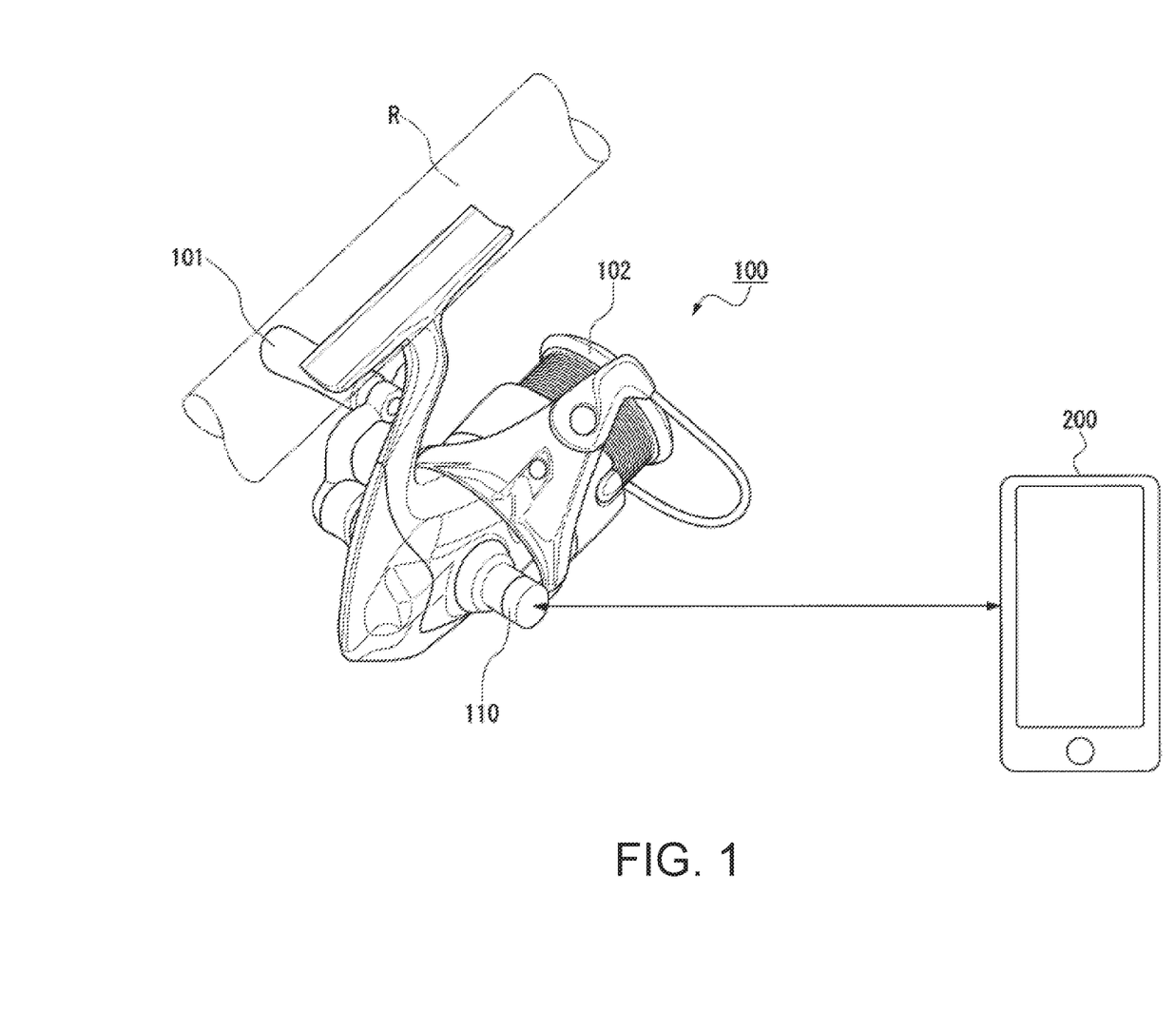
FIG. 1 is a view illustrating a configuration example of a handle operation assist system according to the present embodiment.

An example of a handle operation assist system according to the present embodiment will be described with reference to FIG. 1. The handle operation assist system in the drawing comprises a spinning reel 100 and a user terminal 200 (one example of a handle operation assist device).

The spinning reel 100 is a type of fishing reel and is attached to a rod R when a user wishes to fish. As shown in FIG. 1, the spinning reel 100 is attached to the rod R by being mounted on a reel attachment pedestal (reel sheet), not shown, disposed on the rod R.

The user terminal 200 is a terminal device that is carried by the user. The user terminal 200 may be a smartphone, for example or a tablet or any other suitable device. If the user terminal 200 is a terminal such as a smartphone, an application corresponding to the handle operation assist (handle operation assist application) is installed in the user terminal 200. The user terminal 200 may be, for example, a dedicated terminal specialized to the handle operation assist function of the present embodiment.

A sensor 110 is disposed on the spinning reel 100 of the present embodiment. The sensor 110 is capable of detecting the angular velocity corresponding to the rotation of a handle 101. In the embodiment illustrated in FIG. 1, the sensor 110 is disposed at a location corresponding to a handle screw cap.

The sensor 110 can comprise an angular velocity sensor. In this embodiment, the angular velocity sensor of the sensor 110 can be directly attached to a prescribed component or move in conjunction with the rotation of a prescribed component, such as a gear or a shaft that rotates in accordance with the rotation of the handle 101. The angular velocity sensor can thereby detect the angular velocity corresponding to the rotation of the handle 101.

Alternatively, the sensor 110 can include, for example, a rotary encoder using a magnetic method, etc. The rotary encoder of the sensor 110 in this embodiment can comprise a magnet disposed on a prescribed component, such as a gear or a shaft that rotates in accordance with the rotation of the handle 101, and a magnetic sensor that detects changes in the magnetic field of the magnet corresponding to the rotation of the component. In this embodiment, the angular velocity can be calculated as the change corresponding to the progress of the angle that is detected by the rotary encoder. In addition, the calculation of the angular velocity based on the angle detected by such a rotary encoder can be carried out in the sensor 110 or can be executed by the user terminal 200 based on the angle detected by the rotary encoder.

The sensor 110 is connected so as to be capable of communicating with the user terminal 200. In FIG. 1, wireless communication between the sensor 110 and the user terminal 200 is possible. The sensor 110 transmits an angular velocity detection signal to the user terminal 200 that is output by a sensor part 111 via wireless communication.

Communication between the sensor 110 and the user terminal 200 can be wired. In the following description, an embodiment in which the sensor 110 and the user terminal 200 carry out wireless communication will be described.

The user terminal 200 receives the angular velocity detection signal transmitted from the sensor 110 and measures the angular velocity of the handle 101 (handle angular velocity) based on the received angular velocity detection signal. The angular velocity of the handle 101 is detected by the sensor 110 as long as there is movement accompanying the rotation of the handle 101. Accordingly, it is possible to detect changes in the angular velocity within one rotation of the handle 101. Thus, changes in angular velocity within one rotation of the handle 101 are also reflected in the handle angular velocity that is measured by the user terminal 200.

The user terminal 200 calculates errors in the handle angular velocity with respect to a reference angular velocity and reports the errors. The user terminal 200 can report errors by sound and a display. That is, the user terminal 200 can report errors by changes in pitch that correspond to the error. Additionally, the user terminal 200 can report errors by displaying error-related information in a prescribed manner.

Such notifications act as a guide to assist the user to maintain a constant winding speed. That is, when the user winds the fishing line while checking the degree of error that is reported by sound or display, the user carries out an operation to rotate the handle 101 so as to reduce the error in the angular velocity. As a result, a spool 102 that rotates together with the rotation of the handle 101 also approaches a set rotational speed (number of rotations), and it is possible to carry out a constant-speed winding at the target winding speed.

Additionally, fluctuation of the angular velocity within one rotation of the handle 101 is reflected in the error of the handle angular velocity. Accordingly, notification of the degree of the error of the handle angular velocity is also carried out so as to follow the fluctuation in the angular velocity within one rotation of the handle 101. That is, according to the present embodiment, it is possible to guide the user with regard to the speed with which the handle should be rotated within one rotation of the handle 101.

As a result, the user can adjust the speed with which the handle 101 is rotated while checking the degree of the error that is reported, and carry out the constant-speed winding so as to suppress, and bring close to a constant value, the fluctuation in the angular velocity within one rotation of the handle 101.

The sensor 110 can be provided at any location in the spinning reel 100 at which the angular velocity can be detected in accordance with the rotation of the handle. For example, the sensor 110 may be provided in the handle 101 itself, in the spool 102, or the like.

Figure 2:
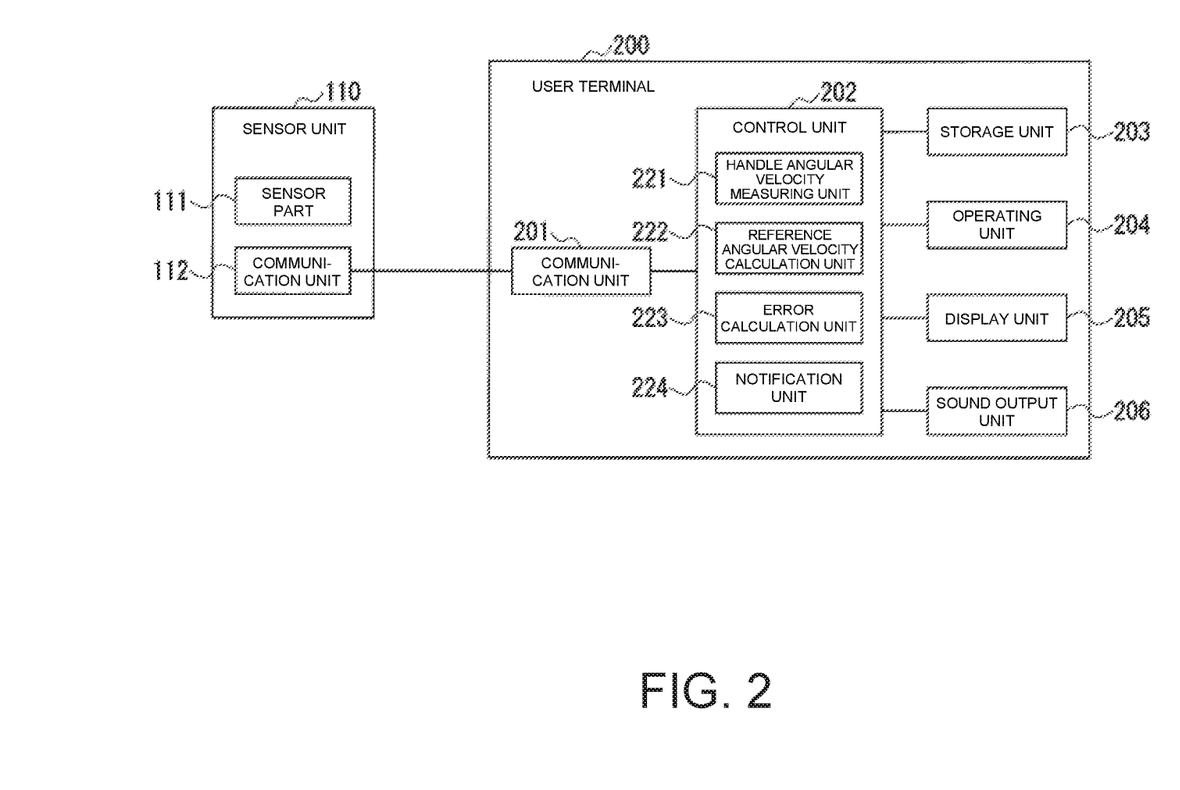
FIG. 2 is a view illustrating an example of a functional configuration of the handle operation assist system according to the present embodiment.

An example of a functional configuration of the handle operation assist system according to the present embodiment will be described with reference to FIG. 2. An example of the functional configuration of the sensor 110 and the user terminal 200 is shown in the drawing.

The sensor 110 comprises the sensor part 111 and a communication unit 112.

As described above, the sensor part 111 includes a prescribed sensor device, for example, and is capable of detecting angular velocity corresponding to the movement of a prescribed component accompanying the rotation of the handle 101.

The communication unit (communicator) 112 communicates wirelessly with the user terminal 200. The wireless communication method supported by the communication unit 112 is not particularly limited, and an example of which is BLUETOOTH. The communication unit 112 transmits the angular velocity detection signal that is output by the sensor part 111 to the user terminal 200.

The user terminal 200 comprises a communication unit (communicator) 201, a control unit (controller) 202, a storage unit (storage) 203, an operating unit (operator) 204, a display unit (display) 205, and a sound output unit (or device) 206.

The communication unit 201 communicates wirelessly with the communication unit 112 of the sensor 110.

The control unit 202 executes various controls in the user terminal 200. The function as the control unit 202 is achieved by a CPU (Central Processing Unit (Central Processer) disposed in the user terminal 200 executing a program.

The control unit 202 in the drawing comprises a handle angular velocity measuring unit or device (velocity measurer) 221, a reference angular velocity calculator 222, an error calculator 223, and a notification unit or device 224. When the user terminal 200 is a smartphone, for example, these functional units in the control unit 202 are realized by operating a handle operation assist application that is installed in the smartphone.

The handle angular velocity measuring unit 221 measures the handle angular velocity based on the output (angular velocity detection signal) of the sensor part 111 of the sensor 110 is capable of detecting the angular velocity that corresponds to the rotation of the handle 101. The handle angular velocity measuring unit 221 can use the angular velocity indicated by the angular velocity detection signal as the measurement result of the handle angular velocity as is. Alternatively, regarding the angular velocity indicated by the angular velocity detection signal, the handle angular velocity measuring unit 221 may use, for example, a value obtained by carrying out a calculation based on the ratio of the rotational speed of the handle 101 and the rotational speed of the component in which the sensor part 111 is provided as the measurement result of the handle angular velocity.

The reference angular velocity calculator 222 calculates the reference angular velocity based on the handle angular velocity measured during a previous set period of time.

The error calculator 223 calculates the error in the handle angular velocity with respect to the reference angular velocity.

The notification unit 224 reports the error.

The storage unit 203 stores various information corresponding to the user terminal 200.

The operating unit 204 collectively indicates operators and operation devices provided in the user terminal 200. In the case that the display unit 205 is configured as a touch panel, the operating unit 204 includes a touch panel.

The display unit 205 carries out a display in accordance with a control by the control unit 202.

The sound output unit 206 outputs a sound in accordance with a control by the control unit 202.

An example of a case in which an error in the handle angular velocity is reported by sound according to the present embodiment will be explained with reference to FIG. 3.

Figure 3:
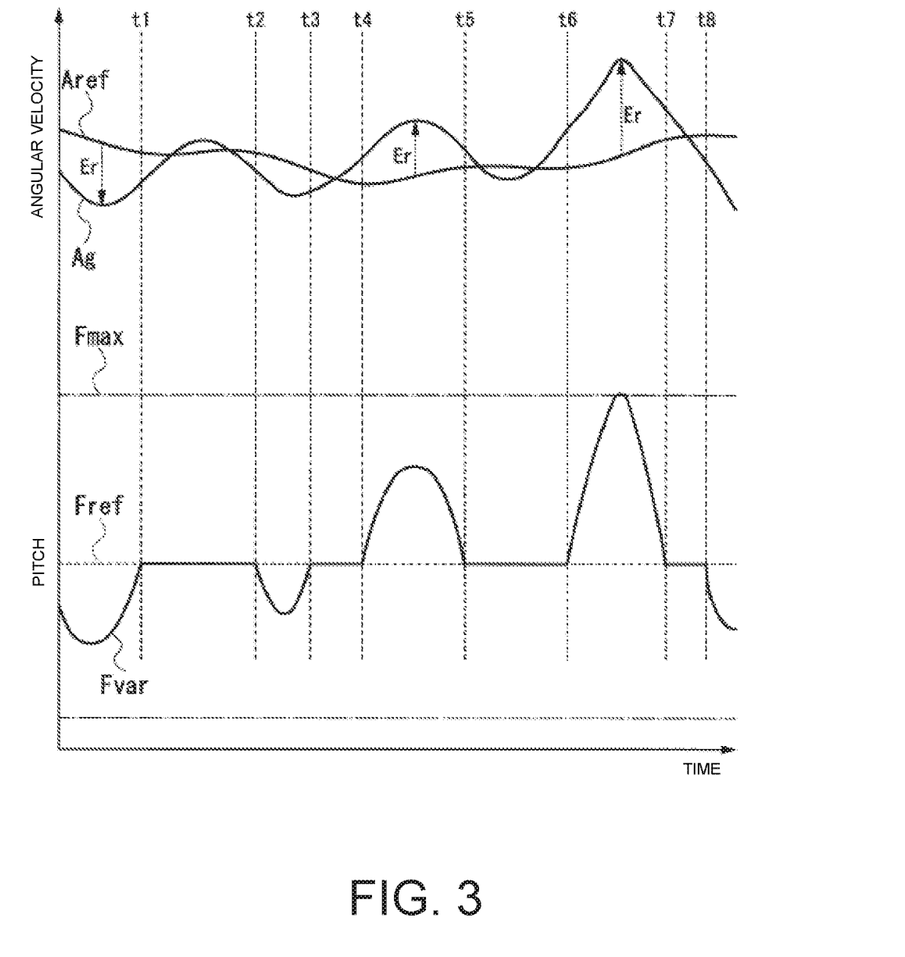
FIG. 3 is a view illustrating an example of a case in which an error in the handle angular velocity is reported by means of sound according to the present embodiment.

FIG. 3 illustrates handle angular velocity Ag, reference angular velocity Aref, and pitch of the notification sound Fvar, with respect to time.

The handle angular velocity Ag indicates the handle angular velocity measured by the handle angular velocity measuring unit 221. The time period shown in the drawing includes at least one period in which the handle 101 is rotated once. That is, the fluctuation within one rotation of the handle 101 is reflected in the handle angular velocity Ag shown in the drawing.

In addition, the reference angular velocity Aref indicates the reference angular velocity calculated by the reference angular velocity calculator 222. The reference angular velocity calculator 222 in this embodiment calculates the reference angular velocity Aref by, for example, calculating the average value (moving average value) of the handle angular velocity calculated during a previous set period of time, starting from the current time.

The reference angular velocity may be fixed and set in advance, for example. Additionally, the reference angular velocity may be selected from a plurality of values that are prepared in advance (preset) in accordance with, for example, the type of tackle (including lures, etc.) or the target fish.

On the other hand, when the reference angular velocity Aref, as in the example in the drawing, is calculated, the reference angular velocity Aref is obtained in accordance with the user actually rotating the handle 101 while imagining the speed of the constant-speed winding corresponding to the type of tackle or the target fish. In this case, there is the benefit that the user can readily obtain a practical reference angular velocity by carrying out an operation to rotate the handle 101 at the user's own target speed of the constant-speed winding without having to carry out an operation to select from a plurality of preset reference angular velocities to match the current fishing situation.

The error calculator 223 calculates the error Er of the handle angular velocity Ag with respect to the reference angular velocity Aref. The error Er is calculated, for example, by subtracting the reference angular velocity Aref from the handle angular velocity Ag. In this embodiment, the error Er is a negative value when the handle angular velocity Ag is smaller than the reference angular velocity Aref and is a positive value when the handle angular velocity Ag is larger than the reference angular velocity Aref.

The notification unit 224 changes the pitch of the notification sound Fvar in accordance with the error Er.

Specifically, the notification unit 224 outputs a standard pitch Fref as the pitch of the notification sound Fvar when the absolute value of the error Er is less than or equal to a preset first threshold.

In the embodiment illustrated in FIG. 3, the periods t1-t2, t3-t4, t5-t6, and t7-t8 correspond to the state in which the absolute value of the error Er is less than or equal to the first threshold. For this reason, in each of the periods t1-t2, t3-t4, t5-t6, and t7-t8, the pitch of the notification sound Fvar is the standard pitch Fref.

In addition, when the absolute value of the error Er is greater than the first threshold and less than a preset second threshold (first threshold<second threshold), the notification unit 224 changes the pitch of the notification sound Fvar so as to follow the amount of error as the change rate (angular velocity change rate) of the handle angular velocity Ag with respect to the reference angular velocity Aref. Specifically, for example, the notification unit 224 may change the pitch of the notification sound Fvar according to a pitch change rate (first pitch change rate) calculated by multiplying the angular velocity change rate by a prescribed coefficient.

In the example of the drawing, the period up to time t1, the period t2-t3, and the period t4-t5 correspond to the case in which the absolute value of the error Er is greater than the first threshold and less than the second threshold.

Of these periods, the error Er is a negative value during the period up to time t1 and the period t2-t3, so that the pitch of the notification sound Fvar is output to change to a sound that is below the standard pitch Fref due to a negative first pitch change rate. On the other hand, the error Er is a positive value during the period t4-t5, so that the pitch of the notification sound Fvar is output to change to a sound that is higher than the standard pitch Fref due to a positive first pitch change rate.

In addition, when the absolute value of the error Er is greater than or equal to the second threshold, the notification unit 224 changes the pitch of the notification sound Fvar according to a pitch change rate that is greater than the first pitch change rate (second pitch change rate). Specifically, the notification unit 224 in this embodiment changes the pitch of the notification sound Fvar to a prescribed limit pitch when the absolute value of the error Er is greater than or equal to the second threshold. That is, the second pitch change rate in this embodiment is set so as to be uniform at a prescribed value that corresponds to the limit pitch, with respect to the change rate of the handle angular velocity Ag with respect to the reference angular velocity Aref.

In FIG. 3, the period t6-t7 corresponds to the embodiment in which the absolute value of the error Er is greater than or equal to the second threshold. In the period t6-t7, in response to the positive error Er is greater than or equal to the second threshold, a maximum limit pitch Fmax that is higher than the standard pitch Fref is output as the pitch of the notification sound Fvar.

Additionally, although not shown in the drawing, when the negative error Er is greater than or equal to the second threshold, the notification unit 224 outputs a prescribed minimum limit pitch that is below the standard pitch Fref as the pitch of the notification sound Fvar.

The user should be able to hear the notification sound that is output from the user terminal 200 while fishing. In this embodiment, the user can place the user terminal 200 within a range in which it is possible to hear the notification sound that is output from the speaker of the user terminal 200 or may connect an earphone, etc., to the user terminal 200 such that the notification sound can be heard through the earphone, etc.

In this embodiment, the user will hear the notification sound when the pitch changes in accordance with irregularities in the rotational speed of the handle 101 while winding (retrieving) the tackle during rotation of the reel handle 101, and will be cognizant of the fact that constant-speed winding should be carried out after the tackle is cast. Therefore, the user can adjust the speed with which the handle 101 is rotated by decreasing the rotation of the handle 101 when the pitch of the notification sound is higher than the standard pitch Fref, and by increasing the rotation of the handle 101 if the pitch of the notification sound is below the standard pitch Fref. It is thereby possible for the user to accurately adjust the rotational speed of the handle 101 for constant-speed winding while checking the pitch of the notification sound, rather than relying only on his or her intuition.

In addition, irregularities in the rotational speed within one rotation of the handle 101 are also reflected in the error Er in the present embodiment. For this reason, the user can adjust the operation of the handle 101 so as to also correct the irregularities in the rotational speed within one rotation of the handle 101.

In addition, the user terminal 200 can also carry out notification relating to the error in the handle angular velocity by a display. Thus, the notification relating to the error in the handle angular velocity provides guidance (a guide) to the user for carrying out an operation to make the rotational speed of the handle 101 constant. Therefore, the display as a notification relating to the error of the handle angular velocity is also referred to as a handle operation guide display.

Figure 4:
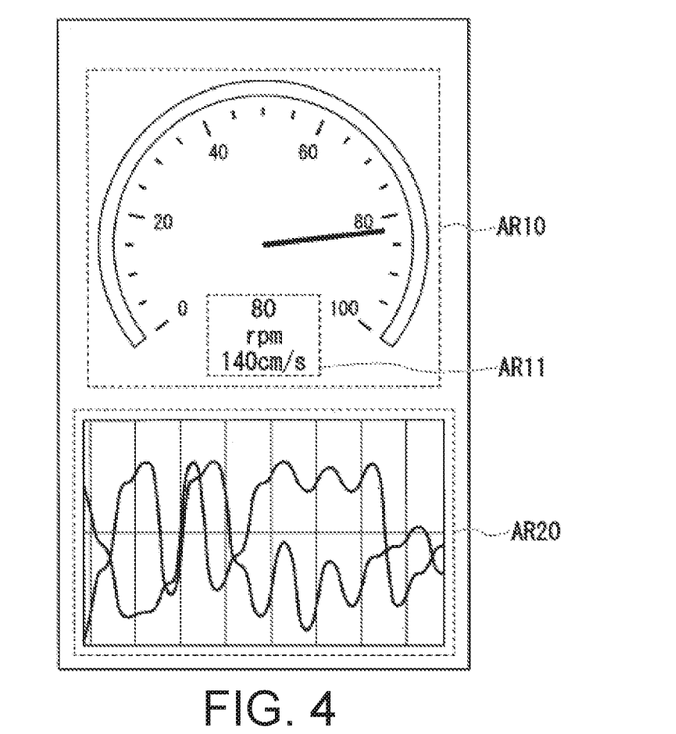
FIG. 4 is a view illustrating an example of a handle operation guide display according to the present embodiment.

FIG. 4 illustrates an example of the handle operation guide display. In the drawing, a handle rotational speed display area AR10 and an angular velocity display area AR20 are arranged on a screen of the display unit 205 of the user terminal 200.

The handle rotational speed display area AR10 indicates the handle rotational speed by a meter display. The handle rotational speed (that is, the rotational speed of the handle 101) may be calculated by the control unit 202 based on the handle angular velocity measured by the handle angular velocity measuring unit 221. The velocity value indicated by a needle in the meter display of the handle rotational speed display area AR10 changes in accordance with the irregularities in the rotational speed of the handle 101, which is operated by the user.

In addition, a reference velocity area AR11 is arranged in the handle rotational speed display area AR10. A reference velocity, such as a reference rotation speed, corresponding to the reference angular velocity is indicated in the reference velocity area AR11. The reference rotation speed ("80 rpm") is shown in the drawing. In this embodiment, the user can ascertain that the reference rotation speed is "80 rpm" by looking at the reference velocity area AR11. Therefore, the user can adjust the speed with which the handle 101 is rotated such that the needle in the meter display of the handle rotational speed display area AR10 points to "80 rpm."

The display mode of the handle rotational speed display area AR10 is not limited to this description. For example, in the handle rotational speed display area AR10, a numerical value that represents the handle rotational speed may be displayed so as to change in accordance with the measured value of the handle angular velocity.

In addition, the reference winding speed ("140 cm/s") corresponding to the reference rotation speed is also indicated in the reference velocity area AR11 of the drawing. The winding speed is the speed with which a fishing line is wound by the spool 102. The reference winding speed is the winding speed that corresponds to the reference angular velocity calculated by the reference angular velocity calculator 222. The winding speed can be calculated based on the handle rotational speed, the rotation ratio between the handle 101 and a rotor, the spool diameter of the spool 102, etc.

For example, the changes on the time axis in the handle angular velocity measured by the handle angular velocity measuring unit 221 and the reference angular velocity calculated by the reference angular velocity calculator 222 are indicated in the angular velocity display area AR20.

Although not illustrated, a winding speed display area may be arranged in addition to the handle rotational speed display area AR10 and the angular velocity display area AR20, or in place of at least one of the handle rotational speed display area AR10 and the angular velocity display area AR20.

The winding speed corresponding to the current handle angular velocity may be indicated in the winding speed display area by, for example, a meter display or a numerical value. In addition, the reference winding speed may be indicated in the winding speed display area.

Figure 5:
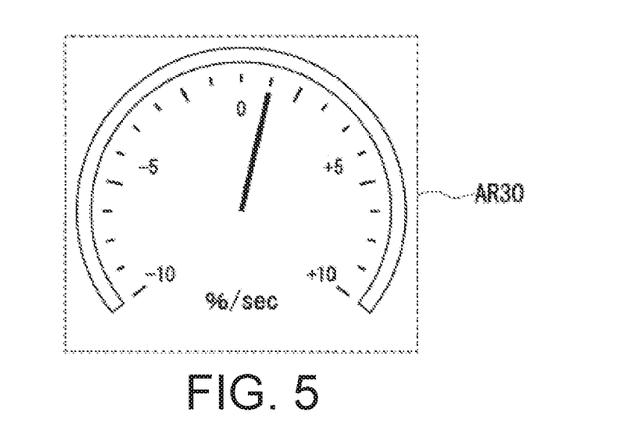
FIG. 5 is a view illustrating an example of the handle operation guide display according to the present embodiment.

In addition, the handle operation guide display may be carried out as shown in FIG. 5. In the drawing, a handle angular velocity error display area AR30 is shown. The error in the handle angular velocity is indicated by a meter display in the handle angular velocity error display area AR30. The user can perform an operation to adjust the rotational speed of the handle 101 such that the needle of the meter points to "0" while carrying out the constant-speed winding.

An example of a processing procedure executed by the user terminal 200 according to the present embodiment will be described with reference to the flowchart of FIG. 6.

In step S101, in the user terminal 200, the handle angular velocity measuring unit 221 calculates the handle angular velocity by utilizing the angular velocity detection signal received from the sensor 110.

In step S102, the reference angular velocity calculator 222 calculates the reference angular velocity by computing, for example, the moving average of the handle angular velocity calculated during a previous set period of time, starting from the current time.

In step S103, the error calculator 223 calculates the error in the handle angular velocity by utilizing the handle angular velocity calculated in step S101 and the reference angular velocity calculated in step S102.

In step S104, the notification unit 224 carries out a control such that the handle operation guide display which reflects the error in the handle angular velocity calculated in step S103 is displayed on the display unit 205.

In step S105, the notification unit 224 determines whether the angular velocity change rate (change rate of the handle angular velocity with respect to the reference angular velocity) is less than or equal to the first threshold.

In step S106, when the angular velocity change rate is less than or equal to the first threshold, the notification unit 224 outputs a notification sound at the standard pitch Fref from the sound output unit 206.

In step S107, when it is determined that the angular velocity change rate is greater than the first threshold in step S105, the notification unit 224 further determines whether the angular velocity change rate is greater than or equal to the second threshold.

In step S108, when the angular velocity change rate is less than the second threshold, the notification unit 224 outputs a notification sound at the pitch that is changed according to the first pitch change rate.

In step S109, when it is determined that the angular velocity change rate is greater than or equal to the second threshold in step S107, the notification unit 224 outputs a notification sound at the pitch that is changed according to the first pitch change rate.

Following the completion of steps S106, S108, and S109, the process returns to step S101.

By the executing the above-described process shown in the drawing, the notification relating to the error in the handle angular velocity is carried out by sound and display, in accordance with the user carrying out the operation to rotate the handle 101 of the spinning reel 100.

Figure 6:
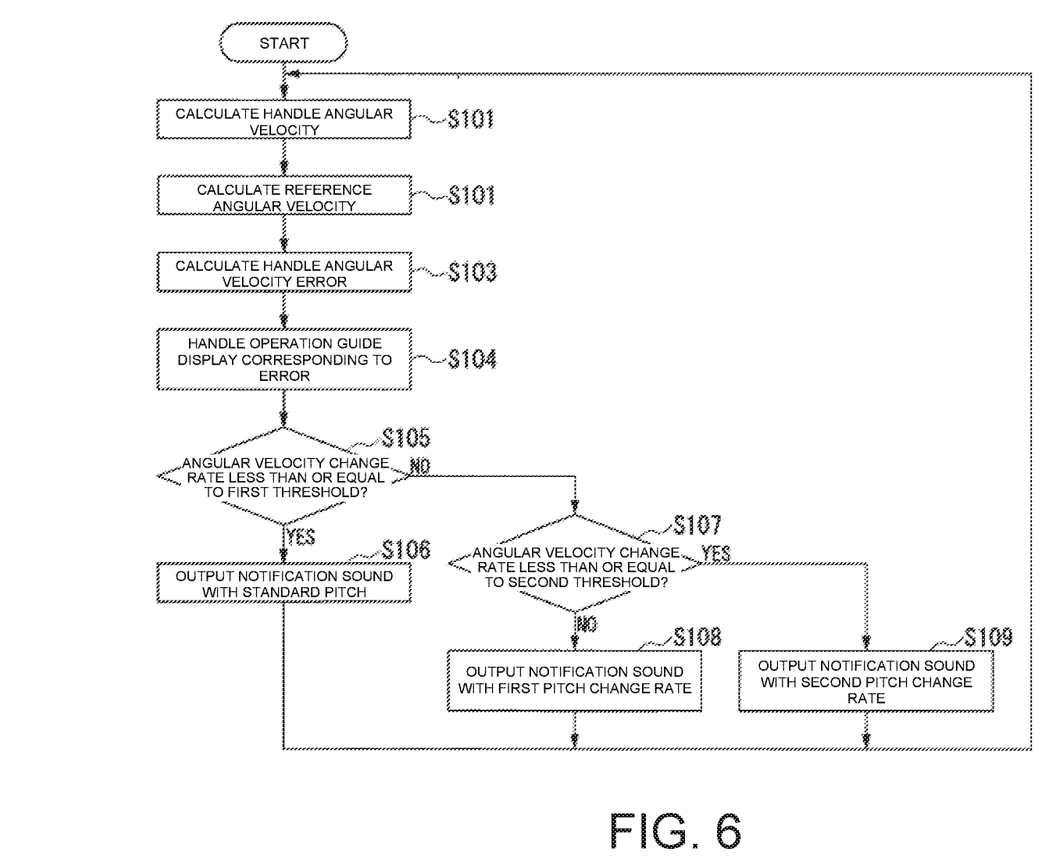
FIG. 6 is a flowchart illustrating an example of the processing procedure executed by a user terminal 200 according to the present embodiment.

In the embodiment of FIG. 6, the notification regarding the error in the handle angular velocity is carried out both audibly and visually. However, the notification regarding the error of the handle angular velocity with respect to the reference angular velocity may be carried out either audibly or visually. In addition, for example, in one embodiment it is possible to switch each of the audible notification and the visual notification ON and OFF in accordance with a user operation of the user terminal 200. The control of the ON and OFF of each of the audible notification and the visual notification corresponding to the operation may be carried out by the notification unit 224.

When notification regarding the error in the handle angular velocity is carried by sound, the notification unit 224 may change the volume in accordance with the error in the handle angular velocity. For example, the notification sound can increase as the error increases. In addition, when notifying by sound, the notification unit 224 can change the tone or the type of sound in accordance with the error in the handle angular velocity. Additionally, the notification unit 224 can carry out notification by sound using a combination of units appropriately selected from pitch, volume, tone, and type of sound.

For example, when the pitch of the notification sound Fvar is changed to higher or lower than the standard pitch Fref in accordance with the angular velocity change rate, as illustrated in FIG. 3, the notification unit 224 may change the tone (or the type of sound) between times when the pitch Fvar is the standard pitch Fref and when the pitch is not the standard pitch Fref. The user is thereby capable of clearly distinguishing between the times when the pitch Fvar is the standard pitch Fref and is not the standard pitch Fref. Additionally, regarding the notification sound, the notification unit 224 may further change the tone between the time when the pitch Fvar is higher or lower than the standard pitch Fref.

In addition, for example, when changing the pitch of the notification sound Fvar at the second pitch change rate in response to the error becoming greater than or equal to the second threshold, the notification unit 224 can increase the volume of the notification sound compared to when the error is below the second threshold.

An indicator using an LED, etc., can be disposed in the user terminal 200, and the notification unit 224 can change the illumination of the indicator in accordance with the error of the handle angular velocity as the notification regarding the error of the handle angular velocity by a display. For example, regarding the indicator, the notification unit 224 can change the color of the indicator such that the color is white when the error is less than or equal to the first threshold, such that the indicator becomes blue (or more intense) as the handle angular velocity becomes slower than the reference angular velocity, and such that the indicator becomes red (or more intense) as the handle angular velocity exceeds the reference angular velocity. In addition, the notification unit 224 can also flash the indicator when the error of the handle angular velocity with respect to the reference angular velocity is greater than or equal to the second threshold.

Additionally, the notification unit 224 can produce a display on the display unit 205 that simulates the illumination of the indicator described above.

Instead of being fixed in advance, the first threshold and the second threshold can be set dynamically based on the measured handle angular velocity, in the same manner as the reference angular velocity. Such a setting of the first threshold and the second threshold can be carried out by the notification unit 224.

For example, when the measured handle angular velocity is small, the handle 101 is being slowly rotated as the constant-speed winding. In this embodiment, it is also a simple matter for the user to adjust the speed with which the handle 101 is rotated. In addition, a fine speed adjustment can be required for the operation of the handle 101. On the other hand, when the measured handle angular velocity is large, the handle 101 is being quickly rotated as the constant-speed winding. In this embodiment, the speed with which the user rotates the handle 101 tends to be uneven, but, since the target winding speed as the constant-speed winding is fast, even if there is a certain degree of unevenness, in practice it is easily established as a constant-speed winding. Therefore, the notification unit 224 can set the first threshold and the second threshold higher when the measured handle angular velocity (the reference angular velocity calculated based on the handle angular velocity) is larger.

In addition, of the first threshold and the second threshold, one may be fixedly set in advance, and the other may be set dynamically based on the measured handle angular velocity.

For example, when rotating the handle 101 to retrieve the tackle, the user is not consciously carrying out constant-speed winding, so that the error of the handle angular velocity with respect to the reference angular velocity increases, and changes in the sound, etc., due to this the notification tends to be extreme. However, since the user is not required to carry out constant-speed winding when retrieving the tackle, the user may become annoyed by the notification.

Therefore, in a state in which an operation to rotate the handle 101 performed in order to retrieve the tackle, the notification unit 224 can be configured to not carry out a notification regarding the error in the handle angular velocity. For this reason, when the number of rotations (rotational speed) of the handle 101 is greater than or equal to a certain value, the notification unit 224 may carry out a control such that the notification regarding the error of the handle angular velocity is not carried out. In contrast to constant-speed winding, in which an operation is often required to rotate the handle 101 relatively slowly, retrieving the tackle often becomes an operation to rotate the handle 101 considerably faster than the constant-speed winding.

The handle operation assist system that carries out a notification corresponding to the error of the handle angular velocity as in the present embodiment can be applied to a combination of the user terminal 200 and a fishing reel other than the spinning reel 100. Examples of the fishing reel other than the spinning reel 100 include a bait reel, an electric reel, and the like. Regarding the electric reel, the handle operation assist system according to the present embodiment can be applied during fishing in a manner in which constant-speed winding is carried out manually. Additionally, when conducting constant-speed winding by electric power, the electric reel can be controlled such that the error is minimal with respect to the rotational speed of a motor that is driven when the fishing line is wound.

In the present embodiment, the handle angular velocity measured error history can be stored. For example, the control unit 202 of the user terminal 200 can store in the storage unit 203 history information that correlates the measured error of the handle angular velocity with respect to the reference angular velocity with time. Alternatively, history information that associates the measured handle angular velocity, the calculated reference angular velocity, and the calculated error with time may be stored in the storage unit 203.

Moreover, for example, the time when a fish could have been caught and the time when there was a hit (fishing result related time) can also be associated with such history information. The association of the fishing result related time can also be carried out in response to, for example, the user carrying out an input operation on the user terminal 200. In addition, a vibration sensor that detects vibration that is transmitted to the spinning reel 100 and the fishing rod in response to there being a hit can be provided, and a detection signal of the vibration sensor can be configured to be input to the user terminal 200. The user terminal 200 can then be configured to associate a fishing result corresponding time with the history information at the timing at which a vibration corresponding to a hit is detected by the vibration sensor.

The above-described process as the user terminal 200 can be executed by storing a program for realizing the above-described function as the user terminal 200 in a storage medium that can be read by a computer and cause a computer system to read and execute the program that is stored in the storage medium. Here, "causing a computer system to read and execute the program that is stored in the storage medium" includes installation of the program in the computer system. The "computer system" here includes the operating system (OS) and hardware such as peripheral devices. In addition, the "computer system" may also include a plurality of computer devices that are connected via a network, including the Internet and communication lines such as WAN, LAN, and dedicated lines. Additionally, the "storage medium that can be read by a computer" refers to storage devices such as portable media such as floppy discs, magneto-optical discs, ROM, and CD-ROM, and hard disks that are incorporated in a computer system. In this manner, the storage medium that stores the program may be a non-transitory storage medium, such as a CD-ROM. In addition, the storage medium includes an internally or externally provided storage medium that can be accessed from a distribution server in order to distribute said program. The code of the program that is stored in the storage medium of the distribution server may be different from the code of the program that is in a format that can be executed by the terminal device. That is, as long as the program can be downloaded from the distribution server and installed in a form that can be executed by the terminal device, the format in which the program is stored in the distribution server is not limited. The program may be divided into a plurality of pieces and merged on the terminal device after downloading at different timings, or the distribution server that distributes each of the divided programs may be different. Moreover, the "storage medium that can be read by a computer" shall also include media that retains the program for a set period of time, such as volatile memory (RAM) inside the computer system which acts as the server or the client when the program is transmitted via the network. In addition, the above-described program may realize some of the above-described functions. Moreover, it may be a program that can realize the above-described functions by being combined with a program that is already stored in the computer system, i.e., a so-called difference file (difference program).

What is claimed is:

1. A handle operation assist device for a fishing rod and reel, comprising:
   a handle angular velocity measuring unit configured to measure a handle angular velocity based on an output of a sensor configured to detect an angular velocity corresponding to rotation of a fishing reel handle, the handle angular velocity measuring unit disposed in a device separate from the fishing rod and reel;
   an error calculator configured to calculate an error in the handle angular velocity with respect to a reference angular velocity; and
   a notification unit configured to carry out notification regarding the error.

2. The handle operation assist device according to claim 1, further comprising
   a reference angular velocity calculator configured to calculate a reference angular velocity based on the handle angular velocity measured during a previous set period of time.

3. The handle operation assist device according to claim 1, wherein
   the notification unit is configured to carry out the notification regarding the error by outputting a notification sound.

4. The handle operation assist device according to claim 1, wherein
   the notification unit is configured to report the error by a display.

5. A handle operation assist device, comprising:
   a handle angular velocity measuring unit configured to measure a handle angular velocity based on an output of a sensor configured to detect an angular velocity corresponding to rotation of a fishing reel handle;
   an error calculator configured to calculate an error in the handle angular velocity with respect to a reference angular velocity; and
   a notification unit configured to carry out notification regarding the error, and configured to change the notification sound in a prescribed manner in accordance with changes in the error.

6. The handle operation assist device according to claim 5, wherein
   the notification unit is configured to change a pitch of the notification sound in accordance with changes in the error.

7. The handle operation assist device according to claim 6, wherein
   the notification unit is configured to change the pitch of the notification sound at a change rate that is greater when the error is greater than or equal to a certain value than when the error is less than the certain value.

8. A computer program product comprising a program stored on a computer readable storage medium and configured, when executed on a processor, to cause
   a computer as a handle operation assist device to function as
   a handle angular velocity measuring unit that measures a handle angular velocity based on an output of a sensor that detects an angular velocity corresponding to the rotation of a fishing reel handle, the handle angular velocity measuring unit is disposed in a device separate from a fishing rod and reel,
   an error calculator that calculates an error in the handle angular velocity with respect to a reference angular velocity, and a notification unit that reports the error.

* * * * *